United States Patent [19]

Mallett

[11] 4,267,426
[45] May 12, 1981

[54] AUTOMATIC STUD WELDING GUN WITH PERFORATED STUD COLLET

[75] Inventor: Lawrence G. Mallett, Rochester, Mich.

[73] Assignee: USM Corporation, Farmington, Conn.

[21] Appl. No.: 70,402

[22] Filed: Aug. 28, 1979

[51] Int. Cl.³ .............................................. B23K 9/20
[52] U.S. Cl. ................................ 219/98; 219/137.43
[58] Field of Search ............ 219/98, 99, 127, 137.42, 219/137.43, 74, 75

[56] References Cited

U.S. PATENT DOCUMENTS

| | | | |
|---|---|---|---|
| 2,475,907 | 7/1949 | Martin | 219/98 |
| 3,204,075 | 8/1965 | Browning | 219/75 |
| 3,736,401 | 5/1973 | Shoup | 219/98 |
| 3,774,005 | 11/1973 | Spisak | 219/98 |
| 3,909,585 | 9/1975 | Sanders et al. | 219/137.42 X |

FOREIGN PATENT DOCUMENTS 3702  8/1979  European Pat. Off. ............ 219/137.43

*Primary Examiner*—Bruce A. Reynolds
*Assistant Examiner*—Keith E. George
*Attorney, Agent, or Firm*—Aubrey C. Brine; Vincent A. White

[57] ABSTRACT

A stud welding gun wherein air pressure is employed to feed a stud into a collet which holds the stud against a work piece is provided with a collet held in a guide bushing and having a plurality of openings at a position wherein air used to feed the stud is forced into a space between the collet and flash shield. The air serves to clean the flash shield and the guide bushing of contaminate material.

1 Claim, 3 Drawing Figures

AUTOMATIC STUD WELDING GUN WITH PERFORATED STUD COLLET

BACKGROUND OF THE INVENTION

The present invention relates to a collet for retaining a stud or button headed fastener and more particularly to a collet for use in an automatic stud welding device.

In the field of stud welding, many problems exist due to the contaminants produced by the welding process, which may be harmful to the surface of the workpiece onto which the stud is welded, as well as to the equipment itself. These contaminants are known in the trade as splatter, or smut, and may be deposited on the workpiece itself, or become deposited on the welding equipment adjacent the collet.

In the case of splatter, the material produced by a number of welding operations tends to build within the area of the welding gun adjacent the collet, and in many instances may cause arcing to be produced between the equipment and the work surface. In practice then, it is necessary to remove the splatter or smut from the area adjacent the collet from time to time in order to maintain the integrity of the welding operation. This practice requires interruption of the welding operation for a period of time, which in a production line operation can be both time consuming, and expensive.

It is therefore an object of the present invention to provide a welding device wherein means are provided to remove smut and splatter after each operation of the device.

Another object of the invention is to provide a novel collet for use in a stud welding gun of the automatic type wherein a gaseous, discharge is provided adjacent the collet after each welding operation, to remove splatter or smut which accumulates.

SUMMARY OF THE INVENTION

The aforementioned objects and other objectives which will become apparent as the description proceeds are accomplished by providing a collet for use in an automatic stud welding gun wherein the studs are fed by a gaseous pressure to the collet to be retained thereby for welding, where the collet comprises wall structure forming a tubular member having a large diameter portion of substantially constant cross section extending from one end thereof toward the small diameter portion of substantially constant cross section, at the opposite end. A plurality of openings are formed in the collet wall structure about the circumference thereof for allowing gas to vent through the wall structure.

In another aspect of the invention, an automatic welding gun for end welding studs to a panel having wall structure defining a conduit into which such studs are fed by gaseous pressure and means connecting such conduit with a source of studs, and a source of gaseous pressure, is provided with a stud retaining collet comprising wall structure defining a tubular member having a large diameter portion interconnecting with said conduit at one end thereof and extending to a smaller diameter portion at the opposite end thereof. A plurality of openings are formed in said collet wall structure about the circumference for allowing gas fed into said collet from said conduit to vent through said wall structure.

BRIEF DESCRIPTION OF THE DRAWING

The foregoing and other features of the invention will be more particularly described in connection with the preferred embodiment, and with reference to the accompanying drawing, wherein.

DESCRIPTION OF THE PREFERRED EMBODIMENT

Figure 1:
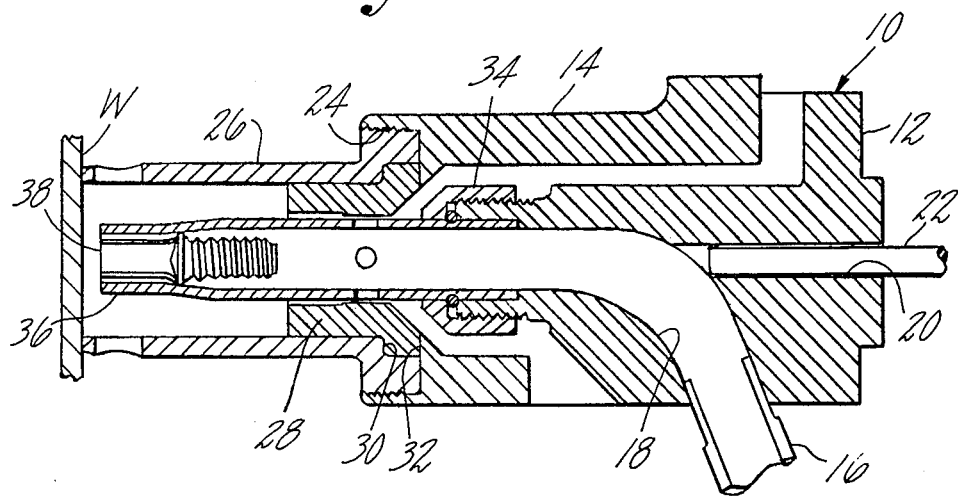
FIG. 1 is a sectional elevational view showing a portion of a stud welding gun in which the invention is employed.

Referring to the drawing and in particular to FIG. 1, there is shown a welding gun head 10 which is attached to a welding gun employed for welding studs to a metallic surface, as is practiced in many industries. The welding device may be one similar to that described in detail in U.S. Pat. No. 3,597,572 issued to Donald H. Ettinger et al, or may be of the type shown in copending patent application Ser. No. 907,393 filed May 18, 1978 in the name of Donald H. Ettinger and entitled Stud Welding with Fluid Shield. The welding gun head 10 generally comprises a receiver block 12 and a flash shield holder 14 disposed in spaced relation with the receiver block.

The receiver block 12 has a feed tube 16 inserted into the block and interconnecting with a conduit 18 formed in the block. A smaller bore 20 is formed in the receiver block 12 and intersects the center line of the conduit 18. A piston rod 22 is slidably mounted in the bore 20 for movement into, and out of, the conduit 18 as will be explained in detail as the description proceeds.

The flash shield holder 14 has a threaded cylindrical opening 24 at the forward end thereof. A flash shield 26 which may be of the type shown in either of the aforementioned patent or patent application, is threadedly received into the opening 24 of the flash shield holder 14. Prior to assembling the flash shield 26 onto the holder 14, however, a collet guide bushing 28 is inserted into interfitting engagement in the flash shield 26, where it is retained between a shoulder 30 on the flash shield 26, and a bearing surface 32 of the flash shield holder 14.

Referring still to FIG. 1, the conduit 18 terminates at the forward end of the receiving block 12 at an externally threaded portion of the block. A collet retaining nut 34 is received on the threaded portion of the receiving block 12 and serves to retain a collet 36, which will be described in detail below, onto the receiver block. The collet 36 is employed for retaining a stud 38 during the welding procedure.

Figure 2:
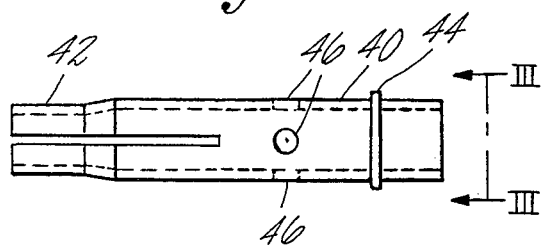
FIG. 2 is an elevational view showing the collet of the structure of FIG. 1.
Figure 3:
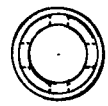
FIG. 3 is an end view taken on the lines III—III of FIG. 2 showing details of the collet of FIG. 2.

The collet 36 of the present invention, is manufactured of a relatively thin sheet of metallic material which is formed into a thin wall cylindrical member as shown in FIGS. 2 and 3. The collet 36 has a large diameter portion of substantially constant diameter extending over approximately three quarters of the length of the collet, and a stepped down portion 42 of substantially constant smaller diameter. A circular ring 44 is assembled to the exterior of the collet 36 to be engaged between the collet retaining nut 34 and the receiver block 12, as shown in FIG. 1. In the present invention, a plurality of circular openings 46 are provided about the periphery of the collet 36, and are four in number as shown in FIGS. 2 and 3. The openings 46 are disposed in the large diameter portion 40 of the collet 36 such that they will properly function to achieve the objective of the invention.

Referring now to FIG. 1, in operation a source of air (not shown) and a source of studs 38 (not shown) are attached to the feed tube 16 in a matter well known in the art. After a welding operation is achieved, a stud 38 is introduced into the tube and air pressure is introduced into the tube 16 behind the stud to force the stud 38 into a position shown in FIG. 1. This operation is generally achieved in sequence with the welding operation through automatic controls which are well known in the art of stud welding. As a further step, the piston rod 22 is then extended forward to move the stud 38 into contact with the work surface W, and the welding current is applied to complete the sequence of operation.

In employing the collet 36 of the present invention, as the stud 38 is introduced into the conduit 18 through the feed tube 16, it proceeds to a point forward of the plurality of openings 46. As this time, the air pressure serving to move the stud 38 through the collet 36 is vented through the openings 46. As will be noted in FIG. 1, when the air is allowed to vent through the openings 46, the air escapes into the guide bushing 28 and flash shield 26. The flow of air purges the guide bushing 28 of weld splatter and smut generated during the weld cycle of the previous welding operation.

When the collet 36 is used in conjunction with a liquid spray nozzle flash shield as disclosed in the aforementioned U.S. Pat. application Ser. No. 907,393 wherein fluid is deposited on the surface W, the air purging also blows off surplus fluid left after the previous weld, thereby reducing the amount of sediment left in the flash shield 26 after prolonged use. The air causes agitation of the water and thereby cleans the front of the nozzle flash shield 26.

I claim:

1. In combination with an automatic welding gun for end welding studs to a panel, having wall structure defining a conduit into which said studs are fed by gaseous pressure and means connecting said conduit with a source of studs and a source of gaseous pressure, a stud retaining collet comprising wall structure defining a tubular member having a large diameter portion of substantially constant cross section interconnecting with said conduit at one end thereof and into which said stud is fed by the gaseous pressure, said large diameter portion extending to a smaller diameter portion at the opposite end thereof for gripping a stud fed to the collet, and a plurality of circular openings formed in the large diameter portion of said collet wall structure and equally spaced about the circumference thereof for allowing gas flowing into said collet from said conduit to vent through said wall structure during the feed of a stud to said collet.

* * * * *